United States Patent Office 2,938,630
Patented May 31, 1960

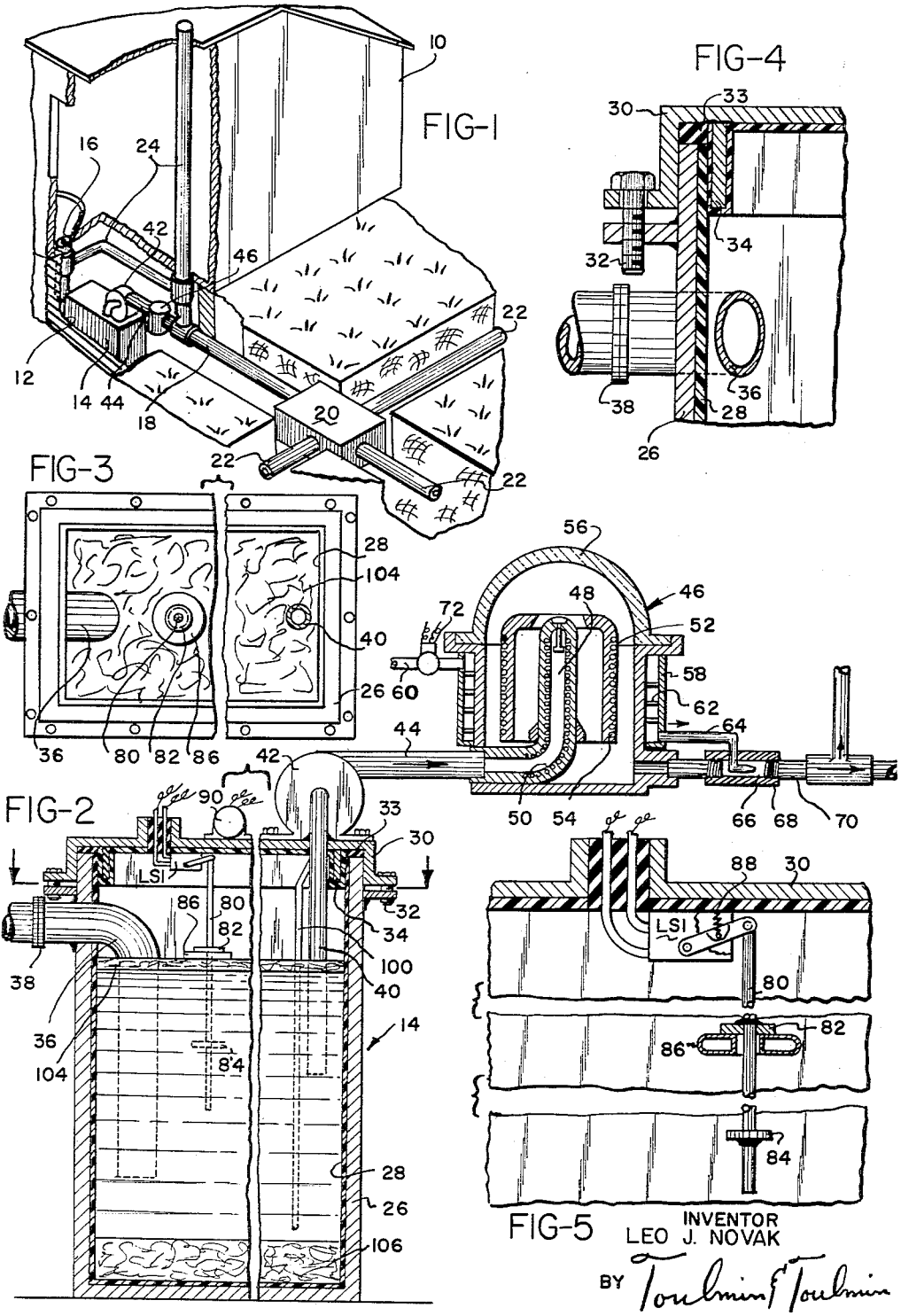

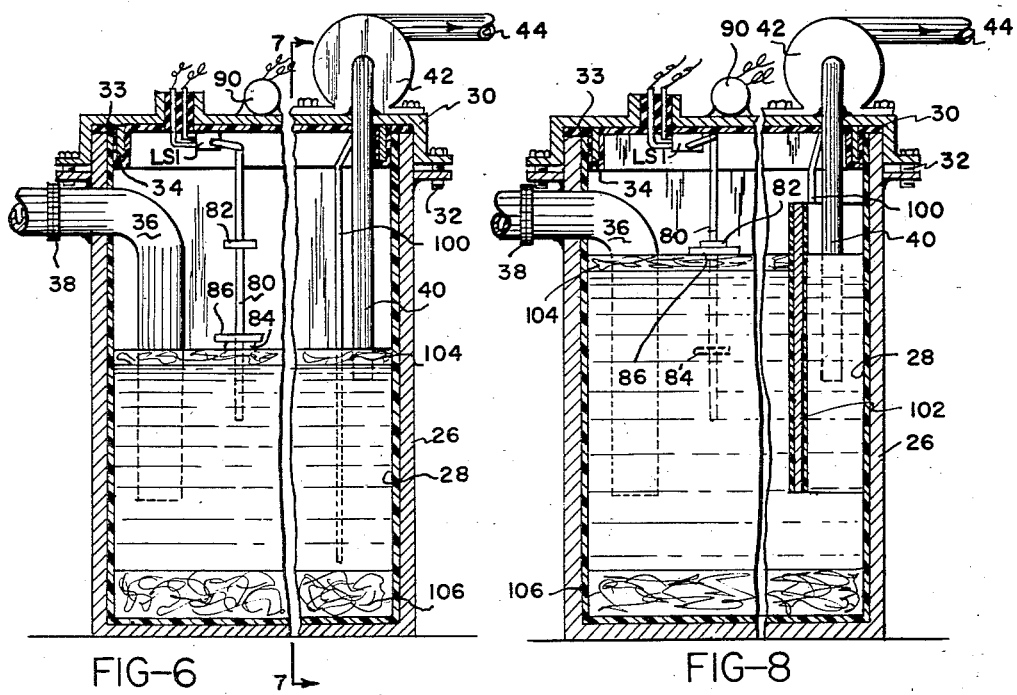
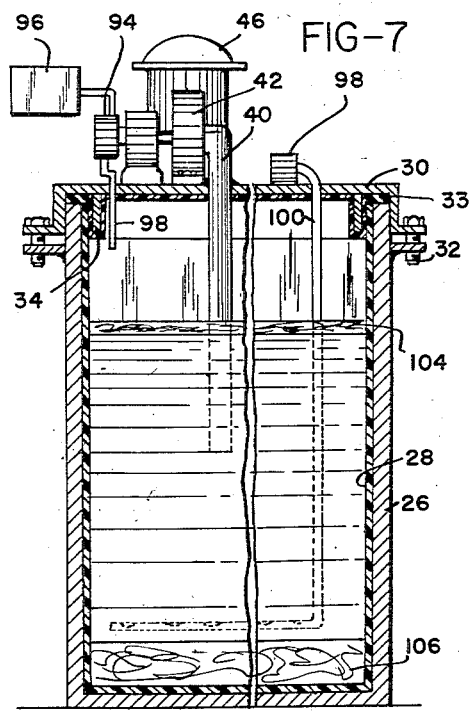
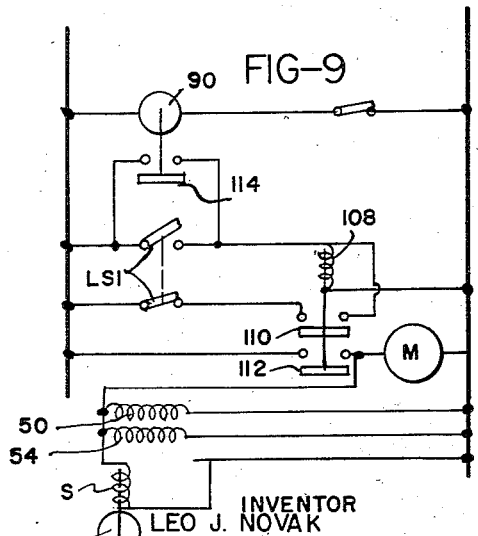

2,938,630

SEPTIC TANK WITH STERILIZER

Leo J. Novak, Dayton, Ohio, assignor to Basic Research Corporation, Wilmington, Del., a corporation of Delaware Filed May 2, 1958, Ser. No. 732,607

6 Claims. (Cl. 210—114)

This invention relates to a method and apparatus for disposing of sewage and is particularly concerned with a septic tank unit and a method of passing sewage therethrough.

In the usual septic tank arrangement for use in rural areas, a concrete tank is provided which is buried in the ground and to which the sewage is delivered. Within the septic tank the sewage digests and there is then an effluent from the tank that flows out to a leaching bed through which it passes into the ground.

With a highly efficient leaching bed such arrangements may be satisfactory but there is always a definite limit to the capacity of such units before the ground becomes saturated with odor bearing liquids. For this reason an important advance in the art of treating sewage in septic tanks can be accomplished by increasing the amount of sewage that can be handled in a given septic tank before the effluent therefrom becomes odorous or laden with undesirable bacteria, particularly those of putrefactive or pathogenic nature.

In certain other cases adequate area is not available for a proper leaching bed or else ground conditions are such that the effluent from the septic tank will not be absorbed sufficiently rapidly to maintain the level in the septic tank low enough to prevent flooding thereof.

Having the foregoing in mind it is a primary object of the present invention to provide a septic tank arrangement which requires the minimum in the way of a leaching bed and from which the effluent can be discharged to a sewer or drainage line if such is available.

Another object of the present invention is the provision of a septic tank which need not be buried in the earth but which can be located in the basement of a dwelling or in a separate pit or enclosure provided therefor which may be located adjacent a basement.

A still further object of this invention is the provision of a septic tank and a method of treating sewage therein and effluent therefrom which substantially eliminates noxious odors in the area of the drainage field of the septic tank and which also converts the effluent into a liquid pure enough to be delivered to sewer lines or other drainage arrangements.

Another object of this invention is the provision of a metallic septic tank which will not corrode and which is completely sealed thus permitting a septic tank to be employed without being buried in the earth.

A still further object of this invention is the provision of a septic tank and a method of operation in which the discharge of the effluent is accomplished by automatically controlled pumping means thereby permitting the septic tank to be placed lower than the leaching bed or the sewer or drainage line to which the effluent is delivered.

Another object of this invention is the provision of a septic tank and a method of operation thereof in which oxygenation of the sewage is accomplished within the septic tank thereby leading to more complete digestion thereof.

It is also an object to provide a septic tank for domestic use which will not require a special installation crew but which can be installed by a plumber.

A still further object of this invention is the provision of a septic tank arrangement having provision for the addition to the sewage of a small amount of lime water or the like whereby to aid the digestion of the sewage and to eliminate odor therefrom.

These and other objects and advantages will become more apparent upon reference to the drawings in which:

Figure 1 is a perspective view illustrating diagrammatically the installation in the basement of a dwelling of a septic tank according to the present invention;

Figure 2 is a diagrammatic sectional view through the septic tank showing the construction of the septic tank and a form of sterilizer for the effluent that can be associated therewith;

Figure 3 is a plan view looking down on top of the tank with the cover removed;

Figure 4 is an enlarged fragmentary detailed view showing how the lid of the tank is bolted on to the tank in sealing relation therewith and how the tank and lid are lined to prevent corrosion thereof;

Figure 5 is a fragmentary view showing a control switch associated with the septic tank and the float member that actuates the switch;

Figure 6 is a view like Figure 2 but shows the sewage in the septic tank at low level and with the control switch being actuated to interrupt actuation of the motor that drives the discharge pump;

Figure 7 is a sectional view indicated by line 7—7 on Figure 6;

Figure 8 is a sectional view similar to Figure 6 but shows the manner in which a baffle can be interposed in the tank about the effluent discharge pipe whereby to prevent scum from being discharged with the effluent; and Figure 9 is a diagrammatic representation of a typical control circuit for controlling the operation of the discharge pump and the sterilizer.

Referring to the drawings somewhat more in detail, Figure 1 illustrates a dwelling 10 having a basement 12 and located in the basement is a septic tank 14.

Septic tank 14 is supplied with sewage via a sewage pipe 16 connected in the usual manner to the household sewage system. The discharge from tank 14 is via a discharge line 18 which may lead to a distributing box 20 forming a part of a leaching bed system that also includes the distributor or the branch conduits 22. Vent means 24 may be supplied leading to either only the inlet side of the septic tank or from both the inlet and exhaust sides thereof.

Turning now to Figures 2, 3 and 4, the septic tank will be seen to comprise a metallic tank of greater length than width with the metal frame part 26 lined as indicated as at 28 with a material that will resist the acids that are developed during the digestion of the sewage or which may be delivered to the septic tank with the sewage. Such a lining may comprise a fused enamel or an epoxy resin or some like coating which will protect the metal of the tank for a long period of time.

The lid of the tank 30 is bolted on to the tank as by the bolts 32 that pass through a flange about the lid and then through a flange provided on the tank. A resilient rubber-like seal element 33 is enclosed between a depending outer periphery of the lid, a depending annular flange 34 formed on the lid and the upper edge of the tank wall. In this manner, by utilizing a one-piece rubber-like gasket, an absolutely air-tight, fluid-tight seal can be provided between the lid and the tank while permitting free removal of the lid.

The tank is provided with the inlet conduit 36 welded into the wall at one end and turned downwardly toward the bottom of the tank so that the sewage is delivered below the level of the liquid in the tank. Conduit 36 may be provided with flange means at 38 for connection with the sewage system of the dwelling in which it is placed.

Discharge of effluent from the tank is accomplished by a discharge conduit 40 which leads to a pump 42. The discharge from pump 42 passes through a conduit 44 into a sterilizer unit 46. This unit is similar to the unit disclosed in my co-pending application, Serial No. 686,349, filed September 26, 1957, and serves to heat the liquid effluent passing therethrough to a point of substantial sterilization thereof thereby greatly reducing the amount of odor causing bacteria therein and making the effluent suitable for delivery to drainage lines and sewers or leaching beds.

The sterilizer 46 comprises a central column 48 having electric heat coils 50 associated therewith, and an outer sleeve 52 having electric heat coil means 54 therein. These members are enclosed within a housing 56 which is provided with a water jacket 58 to which cold water is supplied via inlet pipe 60 and which water circulates about the casing in a spiral path due to the spiral ribbing 62 and then discharges through exhaust pipe 64 to a jet 66 which may form a portion of an inductor 68 which tends to draw the fluid and vapor from the sterilizer 46 and discharges them into the discharge conduit 70.

In addition, the cold water jet provides for a quenching action on the liquid and vapors leaving the sterilizer so that a relatively cool liquid free of vapors is supplied to conduit 70. A solenoid valve 72 may be provided in supply pipe 60 so that cold water is supplied only when the heating elements are energized. As will be seen hereinafter the heating elements and solenoid valve are operated only when the motor for pump 42 is energized.

Control of the motor for pump 42 is accomplished by a switch LS1 which may be mounted in the lid and which is controlled by a rod 80 having collars 82 and 84 thereon. Freely slidably on the rod is float element 86 which will engage collars 82 and 84 and shift rod 80 thereby to control the switch LS1. The switch is provided with a spring 88 which will sustain the weight of the rod and collars so that actuation of the switch does not occur until the float actually engages the collar and develops a thrust thereon.

The control of the motor for pump 42 may be solely by the float element just described but there also may be provided a timing motor 90 so that the pump motor will be energized at predetermined intervals whereby the discharge of effluent from the septic tank is distributed with respect to time thereby making the most efficient possible use of a leaching bed.

As will be seen in Figure 7 there may be provided an auxiliary pump 94, the motor of which is adapted for energization simultaneously with the motor for pump 42 or which may be driven by the same motor as pump 42 and which pump 94 is adapted for pumping lime water or the like from a container 96 to a conduit 98 leading into the septic tank. This supply of lime water aids in the digestion of the sewage and reduces the odor of the effluent.

The arrangement of the present invention also preferably includes an air pump 98 which is adapted for supplying air through conduit 100 to the interior of the septic tank at a low level therein whereby the air bubbles through the sewage and the sewage is thereby aerated and oxygenated.

In Figure 8 is shown a modified arrangement which is identical with the structure previously described except there is provided a baffle 102 forming a chamber in the tank about the discharge conduit 40 so that the scum 104 that forms on the top of the sewage in the septic tank will not be picked up by the discharge conduit, the scum eventually turning into sludge as at 106 in the bottom of the tank or becoming a fluid and passing out with the effluent.

An electric control circuit that may be employed with the arrangement of this invention is illustrated in Figure 9. In this circuit the limit switch LS1 will be seen to comprise a pair of blades with the upper one thereof normally open and the lower one normally closed. Upon the float 86 being lifted by the motor in the tank until it engages collar 82 to lift rod 80, the upper blade of the switch will close and this will energize the coil 108 of a relay having a blade 110 through which the relay coil holds closed through the normally closed lower blade of limit switch LS1. Closing of the relay closes a second blade 112 thereof that energizes the motor M for pump 42 and pump 94 and which will also energize the motor for the air pump 98 where also an air pump is employed. Connected for energization simultaneously with motor M are the heating coils 50 and 54 of the sterilizer and the solenoid S of the solenoid valve 72 for the cooling water.

When the float 86 drops to the point that it will engage collar 84, the lower blade of switch LS1 will open to deenergize the motor, heating coils and valve solenoid.

To provide for time controlled operation, the timer 90 is provided with a blade 114 by-passing the upper normally open blade of limit switch LS1 so that at predetermined intervals if so desired, the relay 108 can be energized to actuate the mechanism and which actuation will continue as described before until the lower blade of switch LS1 is opened.

From the foregoing it will be appreciated that the present invention provides for a simple and effective method and apparatus for receiving and treating and discharging sewage. The septic tank can readily be mounted in a basement area or in a simple pit and by a regular plumber; the leaching bed can be relatively simple and of a minimum size and the effluent can be discharged in most cases to a simple drainage ditch and can be received into any sewer line.

It will be understood that this invention is susceptible to modification in order to adapt it to different usages and conditions; and, accordingly, it is desired to comprehend such modifications within this invention as may fall within the scope of the appended claims.

I claim:

1. In a septic tank arrangement adapted for installation without being buried in the ground; a metallic tank of greater length than width, said tank being sealed and being entirely lined with a corrosive resistant material, a sewage supply conduit entering the tank at one end and an effluent discharge conduit leaving the tank at the other end, a pump in the effluent conduit and sterilizer means in the effluent conduit in series with said pump, a float in the tank, switch means operated by the float for controlling the operation of the pump and sterilizer to maintain the liquid level in the tank between predetermined limits, and for energizing said sterilizer during the period of operation of said pump only, and means for supplying cooling water to the outside of the sterilizer during the period of operation thereof to prevent vapors from being discharged therefrom, said means for supplying cooling water including a solenoid operated control valve, the solenoid of which is connected for being energized simultaneously with said sterilizer.

2. In a septic tank arrangement; a lined metallic tank of greater length than width, a sewage supply conduit entering the tank at one end and an effluent discharge conduit leaving the tank at the other end, a pump in said effluent conduit, a sterilizer also in said effluent conduit comprising an outer casing and internal electric heating means, a float in the tank, a switch controlled by the float at predetermined vertically spaced positions thereof for controlling the operation of the pump to maintain the level in the tank between predetermined limits, said electric heating means also being under the control of said switch so as to be energized during the same period that the pump is operating, means for supplying cooling water to the outside of the casing of the sterilizer during the period that the heating means is energized, and said cooling water being discharged into the effluent conduit down stream from the said sterilizer.

3. In a septic tank arrangement; a lined metallic tank of greater length than width, a sewage supply conduit entering the tank at one end and an effluent discharge conduit leaving the tank at the other end, a pump in said effluent conduit, a sterilizer also in said effluent conduit comprising an outer casing and internal electric heating means, a float in the tank, a switch controlled by the float at predetermined vertically spaced positions thereof for controlling the operation of the pump to maintain the level in the tank between predetermined limits, said electric heating means also being under the control of said switch so as to be energized during the same period that the pump is operating, means for supplying cooling water to the outside of the casing of the sterilizer during the period that the heating means is energized, an inductor in the effluent line down stream from the sterilizer including a jet, and said cooling water discharging via said jet into the effluent line for simultaneously chilling the effluent and for withdrawing the sterilized effluent from the sterilizer.

4. The combination with a septic tank having a sewage supply conduit entering one end and an effluent discharge conduit leaving the other end; of a pump in the effluent conduit, a sterilizer means also in the effluent conduit in series with the pump, a float in the septic tank, switch means operated by the float for controlling the operation of the pump to maintain the liquid level in the tank between predetermined limits, and means operable for energizing said sterilizer means during the period of the operation of said pump only, and means for supplying cooling fluid to said sterilizer to cool the same.

5. The combination wtih a septic tank having a sewage supply conduit entering one end and an effluent discharge conduit leaving the other end; of a pump in the effluent conduit, a sterilizer means also in the effluent conduit in series with the pump, a float in the septic tank, switch means operated by the float for controlling the operation of the pump to maintain the liquid level in the tank between predetermined limits, and means operable for energizing said sterilizer means during the period of the operation of said pump only, there being means for supplying cooling water to the outside of said sterilizer means during the period of operation thereof to prevent vapors from being discharged therefrom.

6. The combination with a septic tank having a sewage supply conduit entering one end and an effluent discharge conduit leaving the other end; of a pump in the effluent conduit, a sterilizer means also in the effluent conduit in series with the pump, a float in the septic tank, switch means operated by the float for controlling the operation of the pump to maintain the liquid level in the tank between predetermined limits, and means operable for energizing said sterilizer means during the period of the operation of said pump only, there being means for supplying cooling water to the outside of said sterilizer means during the period of operation thereof to prevent vapors from being discharged therefrom, and said means for supplying cooling water comprising a solenoid operated control valve, the solenoid of which is connected for being energized simultaneously with said sterlizer means.

References Cited in the file of this patent

UNITED STATES PATENTS

| | | |
|---|---|---|
| 613,093 | Tyson | Oct. 25, 1898 |
| 1,633,079 | Engle | June 21, 1927 |
| 2,243,815 | Griswold | May 27, 1941 |
| 2,358,841 | Walker | Sept. 26, 1944 |
| 2,607,493 | Gordon | Aug. 19, 1952 |
| 2,666,740 | Gordon | Jan. 19, 1954 |
| 2,763,335 | Janssen | Sept. 18, 1956 |
| 2,777,816 | Schumacker et al. | Jan. 15, 1957 |

FOREIGN PATENTS

| | | |
|---|---|---|
| 13,758 | Great Britain | 1891 |